United States Patent
Fujisaki

(10) Patent No.: US 11,561,852 B2
(45) Date of Patent: Jan. 24, 2023

(54) BMC, SERVER SYSTEM, DEVICE STABILITY DETERMINATION METHOD, AND NON-TRANSITORY COMPUTER-READABLE RECORDING MEDIUM

(71) Applicant: NEC Corporation, Tokyo (JP)

(72) Inventor: Toshihiko Fujisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/473,147

(22) Filed: Sep. 13, 2021

(65) Prior Publication Data
US 2022/0091920 A1 Mar. 24, 2022

(30) Foreign Application Priority Data
Sep. 23, 2020 (JP) .............................. JP2020-158930

(51) Int. Cl.
*G06F 11/07* (2006.01)
(52) U.S. Cl.
CPC ...... *G06F 11/0793* (2013.01); *G06F 11/0706* (2013.01); *G06F 11/079* (2013.01); *G06F 11/0772* (2013.01)
(58) Field of Classification Search
CPC ............. G06F 11/0706; G06F 11/0772; G06F 11/079; G06F 11/0793
See application file for complete search history.

(56) References Cited

U.S. PATENT DOCUMENTS

| 10,223,229 B2* | 3/2019 | Wang .................. G06F 11/3055 |
| 2020/0004620 A1* | 1/2020 | Suenaga ............. G06F 11/0772 |
| 2020/0099584 A1 | 3/2020 | Bhattacharyya et al. |

FOREIGN PATENT DOCUMENTS

| JP | 2006-276320 A | 11/2008 |
| JP | 2012-079266 A | 4/2012 |
| JP | 2013-127723 A | 6/2013 |
| JP | 2015-230720 A | 12/2015 |
| JP | 2016-092898 A | 5/2016 |
| JP | 2016-149924 A | 8/2016 |

OTHER PUBLICATIONS

Japanese Office Communication for JP Application No. 2020-158930 dated Nov. 16, 2021 with English Translation.

* cited by examiner

*Primary Examiner* — Joseph R Kudirka

(57) ABSTRACT

A baseboard management controller (BMC) for a server includes a memory configured to store instructions; and a processor configured to execute the instructions to: collect failure information of hardware of the server when a failure of the hardware or a restoration of the hardware is detected by monitoring the hardware; and analyze and determine stability of the server based on the failure information.

8 Claims, 3 Drawing Sheets

BMC, SERVER SYSTEM, DEVICE STABILITY DETERMINATION METHOD, AND NON-TRANSITORY COMPUTER-READABLE RECORDING MEDIUM

This application is based upon and claims the benefit of priority from Japanese patent application No. 2020-158930, filed on Sep. 23, 2020, the disclosure of which is incorporated herein in its entirety by reference.

TECHNICAL FIELD

The present invention relates to a BMC, a server system, a device stability determination method, and a program.

BACKGROUND ART

There is a system that monitors shared devices via a baseboard management controller (BMC) of a server without providing dedicated monitoring hardware for monitoring devices shared between servers.

Japanese Unexamined Patent Application, First Publication No. 2016-149924, Japanese Unexamined Patent Application, First Publication No. 2016-092898, and Japanese Unexamined Patent Application, First Publication No. 2013-127723 disclose a technology related to a BMC as a related technology.

SUMMARY

Incidentally, with a server such as a general rack-type server or a tower-type server, it may be difficult to perform maintenance inspection or part replacement while continuing an operation thereof. For this reason, in a server such as a general rack-type server or a tower-type server, it may be necessary to shut off a power supply as in the case of maintenance inspection or part replacement. In this manner, when a device shared between a plurality of servers using a baseboard management controller (BMC) of a server is monitored in a server system in which each server cannot always secure a stable power supply, it is desirable that the most stable operating BMC among BMCs of the plurality of servers be a master and monitor the shared device.

Therefore, in a server system in which each server cannot always secure a stable power supply, a technology that can identify a BMC that operates stably at a corresponding time is required.

Each example aspect of the present invention has an object to provide a BMC, a server system, a device stability determination method, and a program that can solve the problems described above.

According to one example aspect of the present invention, a baseboard management controller (BMC) for a server includes a memory configured to store instructions; and a processor configured to execute the instructions to:
collect failure information of hardware of the server when a failure of the hardware or a restoration of the hardware is detected by monitoring the hardware; and analyze and determine stability of the server based on the failure information.

According to another example aspect of the present invention, a server system includes BMCs including the BMC described above.

According to still another example aspect of the present invention, a device stability determination method performed by a baseboard management controller (BMC) for a server includes collecting failure information of hardware of a server when a failure of the hardware or a restoration of the hardware is detected by monitoring the hardware; and analyzing and determining stability of the server based on the failure information.

According to still another example aspect of the present invention, a non-transitory computer-readable recording medium storing a program which causes a computer of a baseboard management controller (BMC) for a server to execute collecting failure information of hardware of a server when a failure of the hardware or a restoration of the hardware is detected by monitoring the hardware; and analyzing and determining stability of the server based on the failure information.

EXAMPLE EMBODIMENT

Hereinafter, example embodiments will be described in detail with reference to the drawings.

Example Embodiment

Figure 1:
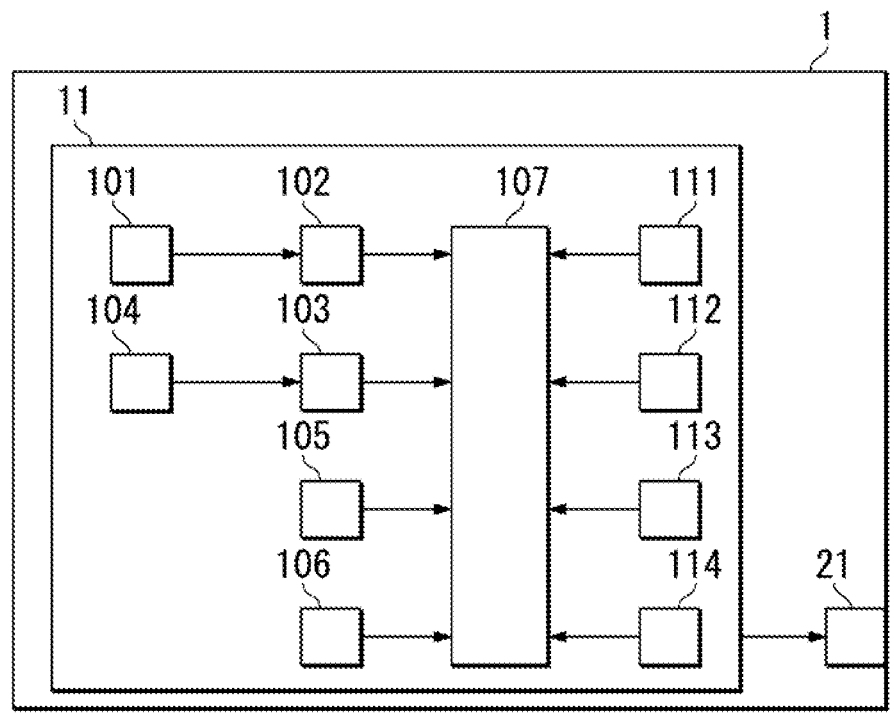
FIG. 1 is a diagram which shows an example of a BMC configuration according to an example embodiment of the present invention.

A server 1 according to an example embodiment of the present invention includes a BMC 11 as shown in FIG. 1.

The BMC 11 includes a HW (Hardware) failure information collection unit 101 (an example of a failure information collection unit), an HW failure analysis unit 102 (an example of a failure analysis unit), a device configuration collection unit 103, a failure rate storage database 104, a BMC self-diagnosis unit 105 (an example of a self-diagnosis unit), a device load information collection unit 106, and a device stability determination unit 107.

The HW failure information collection unit 101 holds failure information when the BMC 11 detects a failure by HW monitoring (that is, monitoring of each device) performed via an Inter-Integrated Circuit (I2C) bus or the like. The failure information includes information such as degeneration of a dual inline memory module (DIMM), which is ascertained by the BMC 11 monitoring it, and dead (that is, a state in which a hard disk tries to start, but it has stopped working and cannot be accessed) of a hard disk drive (HDD) via a redundant arrays of inexpensive disks (RAID) controller, and the like. In addition, when restoration is detected by the HW monitoring performed by the BMC 11, the HW failure information collection unit 101 collects the HW failure information, such as deleting the failure information.

The HW failure information collection unit 101 performs notification to the HW failure analysis unit 102 every time it detects failure and restoration.

The HW failure analysis unit 102 analyzes server stability due to HW failure on the basis of the failure information held by the HW failure information collection unit 101. The HW failure analysis unit 102 analyzes that the stability is low when there is a failure component.

The HW failure analysis unit 102 analyzes the stability every time it receives a notification from the HW failure information collection unit 101, and transmits a result of the analysis to the device stability determination unit 107.

The device configuration collection unit 103 collects configuration information of HW (that is, hardware) of the server 1 such as the type and quantity of a CPU, and the type and mounting position of a DIMM/PCIe board.

The failure rate storage database 104 stores a failure rate of each of components constituting the HW of the server 1.

The device configuration collection unit 103 refers to the failure rate storage database 104 and transmits configuration information for a current HW configuration of the server 1 to the device stability determination unit 107 as a total failure rate.

Every time a change in the HW configuration is detected, the device configuration collection unit 103 transmits the configuration information to the device stability determination unit 107 as the total failure rate.

The BMC self-diagnosis unit 105 collects warning or abnormal level logs from an ipmi log and diagnoses the stability according to a warning level or an abnormal level. For example, the ipmi log is a log which is recorded as a warning log, by comparing a reading value of each sensor with a specified value, when the reading value of a sensor fluctuates by xx percent or more above or below a specified value, and is recorded as an abnormality log when the reading value of a sensor fluctuates by yy percent or more above or below a specified value. For example, according to a temperature sensor, a temperature warning log and a temperature abnormality log are recorded. In addition, according to a voltage sensor, a voltage warning log and a voltage abnormality log are recorded. Since yy percent is larger than xx percent, the abnormal level has lower stability than the warning level. For this reason, the BMC self-diagnosis unit 105 diagnoses the stability based on the number of log items for each of the warning level and abnormal level.

Every time a warning or an abnormality log is detected, the BMC self-diagnosis unit 105 diagnoses the stability and transmits a result of the diagnosis to the device stability determination unit 107.

The device load information collection unit 106 acquires a load of a CPU, or use rates of a memory and a disk via software that collects them on the OS. The device load information collection unit 106 assumes that a load of a device increases as the load of a CPU increases and the use rates of a memory and a disk increase, and transmits the load of a CPU or the use rates of a memory and a disk to the device stability determination unit 107.

The device load information collection unit 106 acquires the load of a CPU or the use rates of a memory and a disk at regular intervals, diagnoses the load of the device, and transmits a result of the diagnosis to the device stability determination unit 107.

The device stability determination unit 107 determines and holds the stability of the entire server 1 based on parameters transmitted from each of the HW failure analysis unit 102, the device configuration collection unit 103, the BMC self-diagnosis unit 105, and the device load information collection unit 106.

The device stability determination unit 107 determines the stability of the server 1 every time a parameter is transmitted, and transmits a result of the determination to a BMC of another server via a BMC/LAN (Local Area Network) 21. The BMC/LAN 21 is a LAN port for reading information and making settings for a BMC using http connection.

In addition, as shown in FIG. 1, the BMC 11 further includes a master BMC selection target IP address list 111, a communicative BMC/IP address list 112, a master BMClog storage memory 113, and a retransmission logID storage memory 114, which are used when a master BMC is selected.

Roles and operations of the master BMC selection target IP address list 111, the communicative BMC/IP address list 112, the master BMClog storage memory 113, and the retransmission logID storage memory 114 will be described later.

The master BMC selection target IP address list 111 is registered when a server is initially constructed.

In addition, each BMC (BMCs 11, 12, 13, and 14 to be described later) secures the same number of retransmission logID storage memories 114 as the number of IP addresses registered in the master BMC selection target IP address list 111 on a memory thereof.

In addition, to suppress complicated switching of the BMC 11 which is a master, until a difference in stability of BMCs (BMCs 12, 13, and 14) of other servers (servers 2, 3, and 4 to be described later) exceeds a specified value, the BMC 11 which is a current master is used as it is.

Next, connections between master and slave BMCs and LANs according to the present invention are shown.

Figure 2:
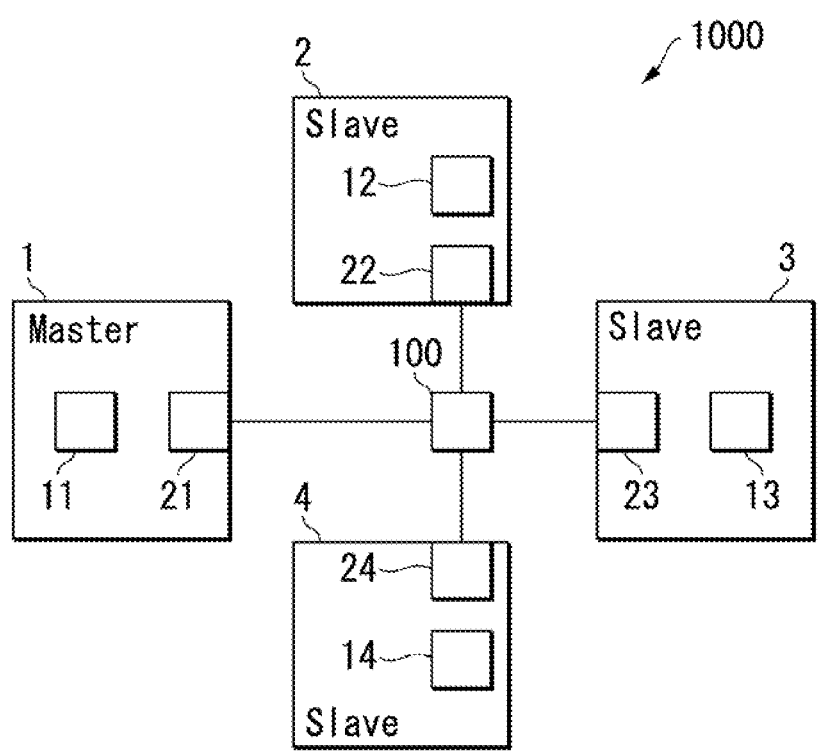
FIG. 2 is a diagram which shows an example of a configuration of a server system according to an example embodiment of the present invention.

FIG. 2 shows a server system 1000 with BMC and LAN connection when the number of servers that are master BMC selection targets is four.

The server system 1000 according to the present invention includes servers 1, 2, 3, and 4.

A server 1 includes a BMC 11 and a BMC/LAN 21. A server 2 includes a BMC 12 and a BMC/LAN 22. A server 3 includes a BMC 13 and a BMC/LAN 23. A server 4 includes a BMC 14 and a BMC/LAN 24.

The BMCs 11, 12, 13, and 14 are connected to a LAN switch 100 via the BMC/LANs 21, 22, 23, and 24.

The BMCs 11, 12, 13, and 14 have the same configuration. Moreover, the servers 1, 2, 3, and 4 have the same configuration.

Next, processing of selecting a master BMC of the server system 1000 according to the present invention will be described. In the following description, with the BMC 11 set as a master BMC, a case in which the master BMC 11 is normal, and a case in which the master BMC 11 is abnormal will be described, respectively.

(When Master BMC 11 is Normal)

Each of the BMCs (BMCs 11, 12, 13, and 14) monitors BMC/IP addresses other than itself in the master BMC selection target IP address list 111 according to a ping. Each of the BMCs (BMCs 11, 12, 13, and 14) records a responsive BMC/IP address in the communicative BMC/IP address list 112. The communicative BMC/IP address list 112 is updated if there is a change every time the ping is monitored.

When the stability of the servers 2, 3 and 4 is transmitted from the slave BMCs 12, 13 and 14, the master BMC 11 checks whether a difference from the stability of the host server 1 exceeds a specified value. If the specified value is exceeded, the master BMC 11 sends an instruction to instruct the slave BMC to be a next master BMC, and the BMC 11 becomes a slave BMC.

(When Master BMC 11 is Abnormal)

When the master BMC 11 times out in ping monitoring, each slave BMC (BMC 12, 13, and 14) transmits its own stability index to BMCs other than the master BMC 11 among BMCs registered in the communicative BMC/IP address list 112. Stability indices transmitted from other slave BMCs (BMCs 12, 13, and 14) are compared, and the most stable one is selected as a new master BMC.

Next, a unit that hands over ipmi log of an old master BMC to a new master BMC will be described. In the following description, a case in which the master BMC 11 is normal, a case in which the master BMC 11 is abnormal, and a case in which the old master BMC recovers from abnormality will be described, respectively.

(When Master BMC 11 is Normal)

Every time a log of a shared device is registered in an ipmi log of the master BMC 11, the master BMC 11 transmits the ipmi log to the BMC/IP addresses registered in the communicative BMC/IP address list 112 via the BMC/LAN 21. Each slave BMC (BMCs 12, 13, and 14) that has received the ipmi log holds the ipmi log of the master BMC 11 as a copy in the master BMClog storage memory 113.

When the master BMC 11 detects a timeout in monitoring the ping for the slave BMCs (BMCs 12, 13, and 14), a logID next after an ipmi log which has been transmitted last as a beginning of a log to be retransmitted to the slave BMC (BMC 12, 13, or 14) is held in the retransmission logID storage memory 114 of the master BMC 11. When there are a plurality of slave BMCs that cannot communicate with the master BMC 11, the retransmission logID storage memory 114 for each slave BMC that is not able to communicate is held.

Moreover, when the master BMC 11 transmits a new ipmi log to each slave BMC (BMC 12, 13, or 14), retransmission logIDs of all slave BMCs that are not able to communicate are also transmitted to each slave BMC that is able to communicate. Each slave BMC that has received these holds them in its own retransmission logID storage memory 114 as a copy of the retransmission logID storage memory of the master BMC 11.

When communication with the slave BMC that are not able to communicate is recovered, the master BMC 11 transmits the ipmi log of a master BMC after the retransmission logID to the slave BMC. Then, the recovered slave BMC is held in the master BMClog storage memory 113 as a copy of the ipmi log of a master.

(When Master BMC 11 is Abnormal)

A new master BMC holds its own ipmi log, which corresponds to a time following the last ipmi log received from the old master BMC 11, in the retransmission logID storage memory 114 as the beginning of a log to be retransmitted to the old master BMC 11.

(When Old Master BMC has Recovered from Abnormality)

The new master BMC transmits the ipmi log from the retransmission logID of the old master BMC 11 to the latest log to the old master BMC 11, and the old master BMC 11 holds it in its own master BMClog storage memory 113 as a copy of the ipmi log of a new master BMC.

As described above, the server system 1000 according to the example embodiment of the present invention has been described.

In the server system 1000, the BMC is a BMC provided in a server system having a plurality of servers that cannot always secure a stable power supply. In the BMC, the failure information collection unit holds failure information when failure is detected by monitoring of hardware performed by the BMC, and collects and holds failure information of the hardware when restoration is detected by monitoring of the hardware. The failure analysis unit analyzes server stability due to failure of the hardware based on the failure information held by the failure information collection unit. The device stability determination unit determines the stability of a server on the basis of a result of the analysis performed by the failure analysis unit.

In this manner, the BMC can identify a BMC that operates stably at a corresponding time in the server system in which each server cannot always secure a stable power supply.

The BMC 11 with a minimum configuration according to the example embodiment of the present invention will be described.

Figure 3:
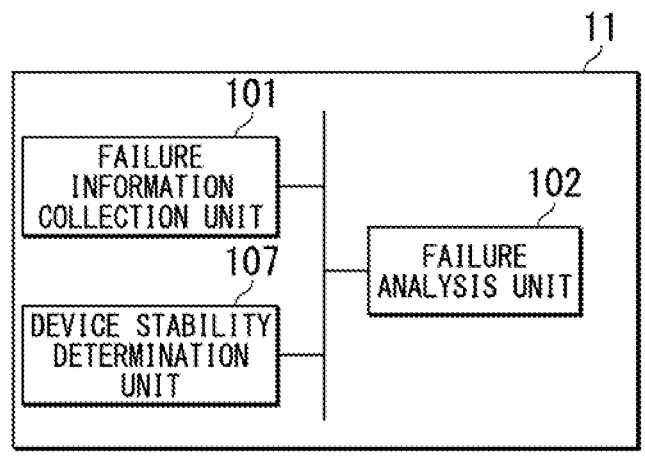
FIG. 3 is a diagram which shows an example of a BMC having a minimum configuration according to the example embodiment of the present invention.

The BMC 11 with a minimum configuration according to the example embodiment of the present invention is a BMC provided in a server system having a plurality of servers that cannot always secure a stable power supply. As shown in FIG. 3, the BMC 11 includes a failure information collection unit 101, a failure analysis unit 102, and a device stability determination unit 107.

The failure information collection unit 101 holds failure information when failure is detected by monitoring of hardware performed by the BMC 11, and collects and holds failure information of the hardware when restoration is detected by monitoring of the hardware.

The failure analysis unit 102 analyzes server stability due to failure of the hardware based on the failure information held by the failure information collection unit 101.

The device stability determination unit 107 determines the stability of a server on the basis of a result of the analysis performed by the failure analysis unit 102.

Figure 4:
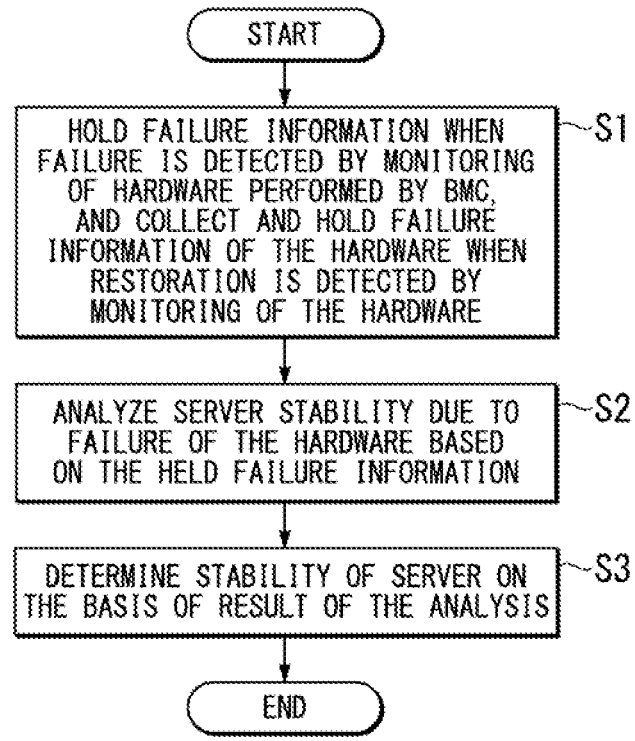
FIG. 4 is a diagram which shows an example of a processing flow of the BMC having a minimum configuration according to the example embodiment of the present invention.

Next, processing of the BMC 11 with a minimum configuration will be described with reference to FIG. 4.

The failure information collection unit 101 holds failure information when a failure is detected by monitoring of hardware performed by the BMC 11, and collects and holds the failure information of the hardware when restoration is detected by monitoring of the hardware (step S1).

The failure analysis unit 102 analyzes server stability due to a failure of the hardware based on the failure information held by the failure information collection unit 101 (step S2).

The device stability determination unit 107 determines the stability of a server on the basis of a result of the analysis performed by the failure analysis unit 102 (step S3).

In this manner, the BMC 11 can identify a BMC that operates stably at a corresponding time in the server system in which each server cannot always secure a stable power supply.

In the processing according to the example embodiment of the present invention, an order of the processing may be changed within a range in which appropriate processing is performed.

Although the example embodiment of the present invention has been described, the servers 1, 2, 3, and 4, the BMCs 11, 12, 13, and 14, and other control devices may have a computer device therein. Processes of the processing described above are stored in a computer-readable recording medium in a form of a program, and the processing is performed by a computer reading and executing this program. A specific example of the computer is shown as below.

Figure 5:
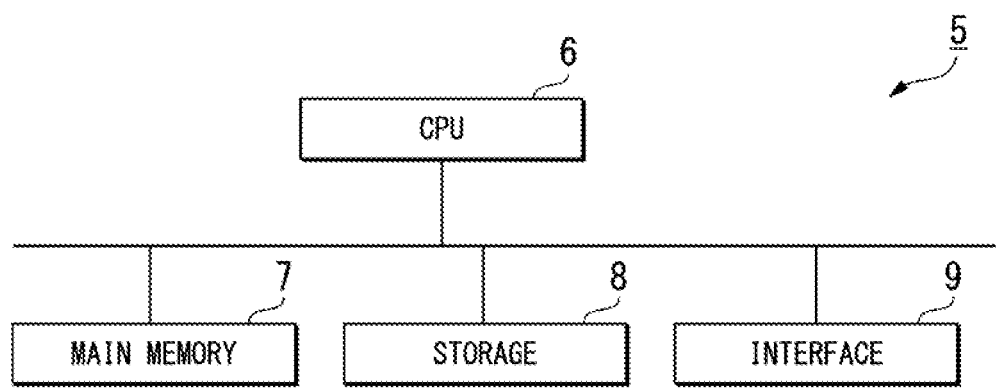
FIG. 5 is a schematic block diagram which shows a configuration of a computer according to at least one example embodiment.

FIG. 5 is a schematic block diagram which shows a configuration of the computer according to at least one example embodiment.

As shown in FIG. 5, a computer 5 includes a CPU 6 (including a vector processor), a main memory 7, a storage 8, and an interface 9.

For example, each of the servers 1, 2, 3, and 4, the BMCs 11, 12, 13, and 14, and other control devices is mounted on the computer 5. Then, the operation of each processing unit described above is stored in the storage 8 in the form of a program. The CPU 6 reads the program from the storage 8, develops it to the main memory 7, and executes the processing described above according to the program. Moreover, the CPU 6 secures a storage area corresponding to each storage unit described above in the main memory 7 according to the program.

Examples of the storage 8 include a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The storage 8 may be an internal media directly connected to a bus of the computer 5, or may be an external media connected to the computer 5 via an interface 9 or a communication line. Moreover, when this program is distributed to the computer 5 via a communication line, the computer 5 that has received the distributed program may develop the program to the main memory 7 and execute the processing described above. In at least one example embodiment, the storage 8 is a non-temporary tangible storage medium.

In addition, the program described above may realize a part of the functions described above. Furthermore, the program may be a file that can realize the functions described above in combination with a program already recorded in a computer device, that is, a so-called difference file (a difference program).

According to each example aspect of the present invention, it is possible to identify BMC that operates stably at a corresponding time in a server system in which each server cannot always secure a stable power supply.

Although some example embodiments of the present invention have been described, these example embodiments are examples and do not limit the scope of the invention. Various additions, omissions, replacements, and changes may be made to these example embodiments in a range not departing from the gist of the invention.

What is claimed is:

1. A master baseboard management controller (BMC) for a server, comprising:
a memory configured to store instructions; and
a processor configured to execute the instructions to:
collect failure information of hardware of the server when a failure of the hardware or a restoration of the hardware is detected by monitoring the hardware;
analyze and determine stability of the server that includes the master BMC based on the failure information, the stability being first stability;
compare second stability with the first stability when the second stability is received from a slave BMC, the second stability being stability of a server including the slave BMC; and
when the second stability exceeds the first stability by a specified value or more, change a master function to a slave function in the master BMC and transmit an instruction to the slave BMC, the instruction instructing the slave BMC to change a function of the slave BMC from a slave function to a master function.

2. The master BMC according to claim 1, wherein the processor is configured to execute the instructions to:
collect configuration information of the hardware of the server that includes the master BMC; and
determine the first stability based on the configuration information of the hardware.

3. The master BMC according to claim 1, wherein the processor is configured to execute the instructions to:
diagnose stability of the hardware based on at least one of a warning level log and an abnormal level log; and
determine the first stability based on the stability of the hardware.

4. The master BMC according to claim 1, wherein the hardware includes a central processing unit (CPU) and a storage device, and
the processor is configured to execute the instructions to:
diagnose a load of the master BMC based on at least one of a load of the CPU and a use rate of the storage device; and
determine the first stability based on the load of the master BMC.

5. A server system comprising:
the master BMC according to claim 1 and a plurality of slave BMCs including the slave BMC.

6. The server system according to claim 5, wherein each of the plurality of slave BMCs transmits own stability to each of the other slave BMCs, compares the own stability with stability of each of the other slave BMCs, and selects a most stable slave BMC as a new master BMC.

7. A processing method performed by a master baseboard management controller (BMC) for a server, comprising:
collecting failure information of hardware of the server when a failure of the hardware or a restoration of the hardware is detected by monitoring the hardware;
analyzing and determining stability of the server that includes the master BMC based on the failure information, the stability being first stability;
comparing second stability with the first stability when the second stability is received from a slave BMC, the second stability being stability of a server including the slave BMC; and
when the second stability exceeds the first stability by a specified value or more, changing a master function to a slave function in the master BMC and transmitting an instruction to the slave BMC, the instruction instructing the slave BMC to change a function of the slave BMC from a slave function to a master function.

8. A non-transitory computer-readable recording medium storing a program which causes a computer of a master baseboard management controller (BMC) for a server to execute:
collecting failure information of hardware of the server when a failure of the hardware or a restoration of the hardware is detected by monitoring the hardware;
analyzing and determining stability of the server that includes the master BMC based on the failure information, the stability being first stability;
comparing second stability with the first stability when the second stability is received from a slave BMC, the second stability being stability of a server including the slave BMC; and
when the second stability exceeds the first stability by a specified value or more, changing a master function to a slave function in the master BMC and transmitting an instruction to the slave BMC, the instruction instructing the slave BMC to change a function of the slave BMC from a slave function to a master function.

* * * * *